March 3, 1936.                C. N. BATSEL ET AL                2,032,393
                                  FILM GATE
                              Filed Dec. 1, 1932

INVENTORS
CECIL N. BATSEL
INER J. LARSON
BY
ATTORNEY

Patented Mar. 3, 1936

2,032,393

UNITED STATES PATENT OFFICE 2,032,393

FILM GATE

Cecil N. Batsel, Collingswood, and Iner J. Larson, Oaklyn, N. J., assignors to Radio Corporation of America, a corporation of Delaware Application December 1, 1932, Serial No. 645,164

5 Claims. (Cl. 88—17)

This invention relates to film gates for maintaining motion picture film in proper relation to the optical system of such apparatus. Such gates usually include a fixed portion and a removable spring-pressed portion between which the film passes. It is necessary that the film be maintained firmly in position and at the same time that it pass easily through the gate. Due to the nature of the emulsion of the film, there is a tendency for the gate to become clogged with foreign matter and cause the film to streak. It is therefore desirable that one part or the other of the gate be readily removable and replaceable to facilitate cleaning.

One object of the present invention is to provide such a film gate wherein the spring-pressed portion is readily removable without the use of tools.

Another object of the invention is to provide such a film gate which is composed of the fewest number of parts consistent with satisfactory operation.

Another object of the invention is to provide such a film gate which can be readily opened for threading the film therethrough.

The invention will be better understood from the following description when considered in connection with the accompanying drawing and its scope will be pointed out in the appended claims.

Figure 1:
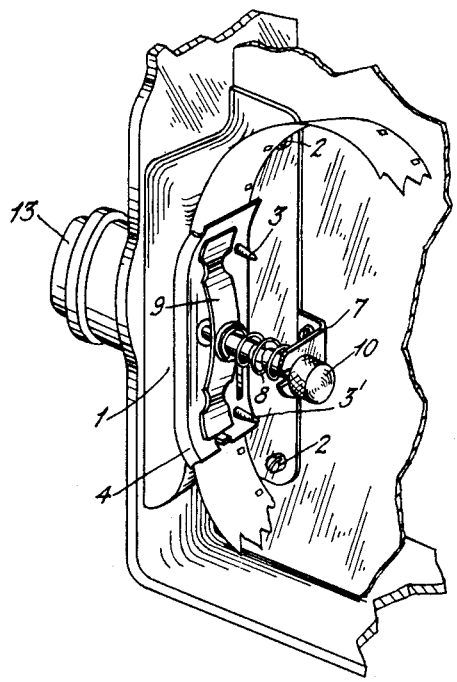
Fig. 1 is a side view of the gate as installed in a camera.

The gate consists of a stationary member 1 which is fixed to the body of the camera by screws 2. This stationary portion 1 has the usual aperture (not shown) defining the margin of the picture. This aperture is, as usual, in alignment with the lens 13, and is the usual more or less rectangular form. From the stationary portion there projects two pins 3 and 3' which slide through corresponding apertures in the movable portion of the gate. The movable portion of the gate includes a shoe 4 which is pressed out of a single piece of metal and so shaped as to contact with the film at the desired portion only. It will be noted that the ends of this shoe are turned backwardly in order to avoid scratching of the film. On the back of this shoe 4 is attached a member 5 in which rotates the reduced end of the member 6 which serves to apply pressure thereto or to retract the pressure shoe.

Figure 2:
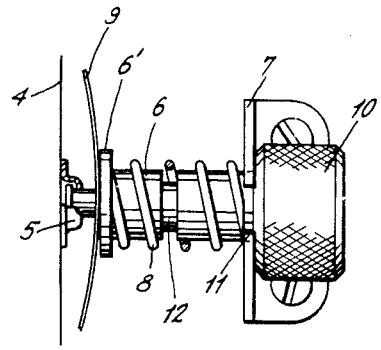
Fig. 2 is a side view of the central portion only of the gate illustrating details thereof. The ends of the spring 9, which contact with the pressure shoe 4, are not shown.

The member 6 is slidable in the bracket 7, which is rigidly attached to the camera, and is pressed for the operating position of the gate by the spring 8. The member 6 has thereon a collar 6' which bears against a leaf-spring 9 which is slightly curved so as to apply pressure near the ends of the pressure shoe. It will be noted from Fig. 2 that the reduced end of the member 6 serves merely to position the gate when in operating position and does not apply pressure thereto.

The shoe 4 is maintained in proper alignment by the pins 3 and 3' as shown in Fig. 1.

In order to open the gate for threading, the knob 10 is pulled so as to move the member 6 longitudinally through the bracket 7, when film can be readily inserted or removed from the gate.

The bracket 10 is provided with a slot 11 and the member 6 is provided with a reduced portion 12 which is less in diameter than the slot. In order to remove the gate for cleaning, the knob 10 is pulled until the reduced portion 12 is in alignment with the slot of the bracket 7 and this entire portion of the gate can then be slid out of the bracket 7. It will be noted that the pins 3 and 3' are made of such length that when the reduced portion 12 is in alignment with the slot 11, the pressure shoe 4 is clear of the ends of the pins and they therefore don't interfere with the removal thereof.

Replacement of the gate is accomplished in the reversed manner, i. e., the spring 8 is compressed and the reduced portion 12 of the member 6 is slid into the slot 11 until the remainder of the member 6 is in alignment with the hole in the member 7 when the knob 10 can be released and the gate immediately drops into position.

It should be noted that the outer edge of the pressure shoe 4 is curved down over the edge of the stationary member 1 thus providing a flange which serves as a film guide.

It will be apparent that our gate construction is by no means limited to the use in cameras before described, but that the construction defined in the following claims may also be used in projectors, soundheads or any other analogous location.

We claim:

1. A film gate comprising a stationary aperture plate and a movable pressure plate, one edge of the said pressure plate extending down past the edge of the said stationary plate to form a side guide for the film, and the ends of both said plate and said edge being curved backwardly.

2. A film gate comprising a pressure shoe, a single spindle supporting said pressure shoe, a bracket supporting said spindle, said spindle and bracket being provided with recesses cooperating in one position of the spindle to permit removal of said spindle for the said bracket in one position and prevent such removal in another position, one edge of said pressure shoe being turned down to co-operate with a stationary plate and to form a side guide for the film.

3. A film gate comprising a stationary aperture plate provided with a pair of guide pins, a movable pressure plate provided with a flange at one edge adapted to guide a film and with apertures at the other edge adapted to receive said guide pins.

4. A film gate comprising a pressure shoe, a single central spindle supporting said pressure shoe, spring means between said spindle and said pressure shoe for applying pressure to the said pressure shoe, and spring means applying pressure to said spindle.

5. A film gate comprising a pressure shoe, a central spindle supporting said pressure shoe and spring means between said spindle and said pressure shoe for applying pressure to the said pressure shoe, a bracket supporting said spindle for axial movement, and spring means cooperating with said bracket and said spindle for maintaining the said spindle in operating position.

CECIL N. BATSEL.
INER J. LARSON.